United States Patent
Plattner et al.

(10) Patent No.: US 9,626,421 B2
(45) Date of Patent: Apr. 18, 2017

(54) ETL-LESS ZERO-REDUNDANCY SYSTEM AND METHOD FOR REPORTING OLTP DATA

(75) Inventors: Hasso Plattner, Schriesheim (DE); Anja Bog, Potsdam (DE); Jan Schaffner, Berlin (DE); Jens Krueger, Berlin (DE); Alexander Zeier, Berlin (DE)

(73) Assignee: Hasso-Plattner-Institut Fur Softwaresystemtechnik GmbH, Potsdam (DE)

( * ) Notice: Subject to any disclaimer, the term of this patent is extended or adjusted under 35 U.S.C. 154(b) by 750 days.

(21) Appl. No.: 12/234,497

(22) Filed: Sep. 19, 2008

(65) Prior Publication Data

US 2009/0240663 A1 Sep. 24, 2009

Related U.S. Application Data

(60) Provisional application No. 60/994,893, filed on Sep. 21, 2007.

(51) Int. Cl.
*G06F 7/00* (2006.01)
*G06F 17/30* (2006.01)

(52) U.S. Cl.
CPC .. *G06F 17/30592* (2013.01); *G06F 17/30315* (2013.01); *G06F 17/30584* (2013.01)

(58) Field of Classification Search
CPC ......... G06F 17/30575; G06F 17/30174; G06F 17/30377; G06F 17/30581
See application file for complete search history.

(56) References Cited

U.S. PATENT DOCUMENTS

| 5,625,815 A | 4/1997 | Maier et al. | |
|---|---|---|---|
| 5,649,089 A * | 7/1997 | Kilner | 714/6.3 |

(Continued)

FOREIGN PATENT DOCUMENTS

| CA | 2425033 A1 | 8/2004 |
|---|---|---|
| CA | 2425033 A1 | 10/2004 |

(Continued)

OTHER PUBLICATIONS

K. Becker and D.D.A. Ruiz. An Aggregate-Aware Retargeting Algorithm for Multiple Fact Data Warehouses. In Yahiko Kambayashi and Mukesh K. Mohania and Wolfram WÖβ, editor, DaWaK, vol. 3181 of Lecture Notes in Computer Science (LNCS), pp. 118-128, Spain, Sep. 2004. Springer Verlag.

(Continued)

*Primary Examiner* — Jau-Shya Meng
(74) *Attorney, Agent, or Firm* — Fountainhead Law Group P.C.

(57) ABSTRACT

A system includes a relational database management system component and a column-oriented data processing component. The relational database system component stores database information in a row format. The column oriented data processing component stores the database information in a column format. In response to a database update request, the relational database management system component updates the database information stored in the row format; the relational database management system component notifies the column-oriented data processing component of the database update request; and the column-oriented data processing component updates the database information stored in said column format. In response to a query request, the column-oriented data processing component generates a query response based on the database information stored in said column format. In this manner, the system is able to (Continued)

generate up-to-date reports without the need for extraction, translation and loading procedures.

20 Claims, 7 Drawing Sheets

(56) References Cited

U.S. PATENT DOCUMENTS

| | | | |
|---|---|---|---|
| 5,794,229 A * | 8/1998 | French et al. | 707/999.002 |
| 5,794,241 A | 8/1998 | Loaiza | |
| 6,374,263 B1 * | 4/2002 | Bunger et al. | 707/999.01 |
| 6,901,380 B1 * | 5/2005 | Bremers | 707/999.1 |
| 7,236,974 B2 * | 6/2007 | Bhattacharjee et al. | 707/999.002 |
| 7,480,663 B2 * | 1/2009 | Colossi et al. | |
| 2004/0030703 A1 * | 2/2004 | Bourbonnais et al. | 707/100 |
| 2004/0205066 A1 | 10/2004 | Bhattacharjee et al. | |
| 2005/0076036 A1 * | 4/2005 | Le | 707/100 |
| 2005/0187977 A1 * | 8/2005 | Frost | G06F 17/30584 |
| 2006/0004691 A1 * | 1/2006 | Sifry | G06F 17/3089 |
| 2006/0271504 A1 * | 11/2006 | Anderson et al. | 707/2 |
| 2008/0059492 A1 * | 3/2008 | Tarin | 707/100 |

FOREIGN PATENT DOCUMENTS

| | | |
|---|---|---|
| IN | 1532/CHENP/2010 | 8/2010 |
| JP | 2004530213 A | 9/2004 |
| JP | 2004303212 A | 10/2004 |
| JP | 2005018751 A | 1/2005 |
| JP | 2006155663 A | 6/2006 |
| JP | 2007334402 A | 12/2007 |
| WO | 2005098652 A2 | 10/2005 |
| WO | 2006060773 A2 | 6/2006 |
| WO | 2006136025 A1 | 12/2006 |

OTHER PUBLICATIONS

G.P. Copeland and s. Khoshafian. A Decomposition Storage Model. In S.B. Navathe, editor, Proceedings of the 1985 ACM SIGMOD International Conference on Management of Data, Austin, Texas, May 28-31, 1985, pp. 268-279. ACM Press, 1985.
N.R. Mahapatra and B. Venkatrao. The Processor-Memory Bottleneck: Problems and Solutions. Crossroads, 5(3):2, 1999.
A. Y. Noaman and K. Barker. A Horizontal Fragmentation Algorithm for the Fact Relation in a Distributed Data Warehouse. In CIKM '99: Proceedings of the Eighth International Conference on Information and Knowledge Management, pp. 154-161, New York, NY, USA, 1999. ACM Press.
A Simitsis, P. Vassiliadis, and T. Sellis. State-Space Optimization of ETL Workflows. IEEE Transactions on Knowledge and Data Engineering, 17(10):1404-1419, 2005.
C. Yu. High-Dimensional Indexing: Transformational Approaches to High-Dimensional Range and Similarity Searches, vol. 2341/ 2002. Springer-Verlag New York, Inc, Secaucus, NJ, USA, 2002.
European Search Report (from a corresponding foreign application), Appln No. 07117089, mailed Jan. 8, 2008.
PatHelland's Weblog, published Jun. 14, 2007, "Accountants Don't Use Erasers". http://blogs.msdn.com/pathelland/archive/2007/06/14/accountants-don-t-use-erasers.aspx.
Daniel J. Abadi; Samuel R. Madden; and Miguel C. Ferreira, "Integrating Compression and Execution in Column-Oriented Database Systems", SIGMOD 2006, Jun. 27-29, 2006, Chicago, Illinois.
MDX Data Manipulation Statements (MDX), 2008. http://msdn.microsoft.com/en-us/library/ms144786(printer).aspx.
MDX Data Definition Statements (MDX), 2008. http://msdn.microsoft.com/en-us/library/ms144926(printer).aspx.
Functions (MDX Syntax), 2008. http://msdn.microsoft.com/en-us/library/ms145563(printer).aspx.
MDX Language Reference (MDX), 2008. http://msdn.microsoft.com/en-us/library/ms145595(printer).aspx.
MDX Function Reference (MDX), 2008. http://msdn.microsoft.com/en-us/library/ms145970(printer).aspx.
Working with Members,ples, and Sets (MDX), 2008. http://msdn.microsoft.com/en-us/library/ms146040(printer).aspx.
MDX Syntax Conventions (MDX), 2008. http://msdn.microsoft.com/en-us/library/ms144760(printer).aspx.
Operators (MDX Syntax), 2008. http://msdn.microsoft.com/en-us/library/ms144825(printer).aspx.
MDX Scripting Statements (MDX), 2008. http://msdn.microsoft.com/en-us/library/ms145482(printer).aspx.
Identifiers (MDX), 2008. http://msdn.microsoft.com/en-us/library/ms145572(printer).aspx.
MDX Statement Reference (MDX), 2008. http://msdn.microsoft.com/en-us/library/ms145610(printer).aspx.
Expressions (MDX), 2008. http://msdn.microsoft.com/en-us/library/ms145971(printer).aspx.
MDX Operator Reference (MDX), 2008. http://msdn.microsoft.com/en-us/library/ms144766(printer).aspx.
Reserved Keywords (MDX Syntax), 2008. http://msdn.microsoft.com/en-us/library/ms144887(printer).aspx.
Multidimensional Expressions (MDX) Reference, 2008. http://msdn.microsoft.com/en-us/library/ms145506(printer).aspx.
Comments (MDX Syntax), 2008. http://msdn.microsoft.com/en-us/library/ms145585(printer).aspx.
MDX Reserved Words, 2008. http://msdn.microsoft.com/en-us/library/ms145629(printer).aspx.
MDX Syntax Elements (MDX), 2008. http://msdn.microsoft.com/en-us/library/ms146020(printer).aspx.
Jovanka Adzic and Valter Fiore, "Data Warehouse Population Platform," Lecture Notes in Computer Science (LNCS), 2209, 2001.
Itamar Ankorion, Change Data Capture—Efficient ETL for Real-Time BI; DM Review Magazine, Jan. 2005.
P. Boncz, "Monet: A Next-Generation DBMS Kernel for Query-Intensive Applications." PhD Thesis, Universiteit van Amsterdam, Amsterdam, Netherlands, May 2002.
S. Brobst. "Enterprise Application Integration and Active Data Warehousing." In Proceedings of Data Warehousing 2002, pp. 15-23, Heidelberg, Germany, 2000. Physica-Verlag GmbH.
F. Chang, J. Dean, S.Ghemawat, W.C. Hsieh, D.A. Wallach, M. Burrows, T. Chandra, A. Fikes, and R.E. Gruber, "Bigtable: A Distributed Storage System for Structured Data." In USENIX'06: Proceedings of the 7th Conf. on USENIX Symposium on Operating Systems Design and Implementation, pp. 15-15, Berkeley, CA, USA, 2006. USENIX Association.
E.F. Codd, "A Relational Model of Data for Large Shared Data Banks." Communications of the ACM, 13:377-387, Jun. 1970.
J.F. Gantz et al., "The Expanding Digital Universe: A Forecast of Worldwide Information Growth Through 2010." IDC White Paper, Mar. 2007.
W.H. Inmon, "When are Star Schemas Okay in a Data Warehouse?" B-Eye: Business Intelligence Network—The Global Vision for BI and Beyond, Jul. 2007.
T. Legler, W. Lehner, and A. Ross, "Data Mining with the SAP NetWeaver BI Accelerator." In VLDB '06: Proceedings of the 32nd International Conference on Very Large Data Bases, pp. 1059-1068. VLDB Endowment, 2006.
M. Stonebraker et al., "C-Store: A Column-oriented DBMS," in VLDB '05: Proceedings of the 31st International Conference on Very Large Data Bases, pp. 553-564. VLDB endowment, 2005.
Daniel J. Abadi, Peter A. Boncz, and Stavros Harizopoulos, "Column-Oriented Database Systems," VLDB '09, pp. 1664-1665, Aug. 24-28, 2009.
W.H. Inmon. Information Management: World-Class Business Intelligence. DM Review Magazine, Feb. 2005.
W.H. Inmon. Building the Data Warehouse, 3rd Edition. pp. 29-30,32, and 126. John Wiley & Sons, Inc., New York, NY, USA, 2002.
R. Kimball and J. Caserta. The Data Warehouse ETL Toolkit: Practical Techniques for Extracting, Cleaning. John Wiley & Sons, Inc., pp. 426-428, New York, NY, USA, 2004.

(56) References Cited

OTHER PUBLICATIONS

A. Knöpfel, B. Gröne, and P. Tabeling. Fundamental Modeling Concepts: Effective Communication of IT Systems. Appendix B, pp. 300-301. John Wiley & Sons, Inc., May 2006.
L.T. Moss and S. Atre. Business Intelligence Roadmap: The Complete Project Lifecycle for Decision-Support Applications. pp. 228-229, Addison-Wesley, 2003.
N.H. Rasmussen, P.S. Goldy, and P.O. Solli. Financial Business Intelligence: Trends, Technology, Software Selection, and Implementation. pp. 96-97, John Wiley & Sons, Inc., New York, NY, USA, 2002.
W. Liang and J.X. Yu, "Revisit on View Maintenance in Data Warehouses." In WAIM '01: Proceedings of the Second International Conference on Advances in Web-Age Information Management, 2001.
Examiner's first report for Australian Patent Application No. 2008300503 dated May 22, 2012.
Office Action mailed Oct. 17, 2011 for Chinese Patent Application No. 200880108120.6 entitled "ETL-less Zero Redundancy System and Method for Reporting OLTP Data".
Second examination report for Chinese Patent Application No. 200880108120.6 mailed May 2, 2012.
First Examination Report in corresponding Canadian Patent Application No. CA 2,700,074, mailed Jun. 19, 2014; 2 pages.
Notification of Third Office Action in corresponding China Patent Application No. CN 200880108120.6, mailed Jan. 14, 2013; 8 pages.
Notification of Fourth Office Action in corresponding China Patent Application No. CN 200880108120.6, mailed Sep. 22, 2013; 8 pages.
Mike Stonebraker, et al.; "C-Store: A Column-oriented DBMS"; from Proceedings of the 31st VLDB Conference, Trondheim, Norway; 2005; 12 pages.
Extended European Search Report in corresponding European Patent Application No. EP 07117089.8, mailed Jan. 18, 2008; 6 pages.
First Examination Report in corresponding European Patent Application No. EP 07117089.8, mailed Dec. 14, 2012; 5 pages.
Translation of JP Examination Report for JP Appln. No. 2010-525373 dated Feb. 26, 2013, 5 pages.

\* cited by examiner

| sID | c1 | c2 | c3 |
|---|---|---|---|
| 1 | v11 | v12 | v13 |
| 2 | v21 | v22 | v23 |
| 3 | v31 | v32 | v33 | row-oriented

| sID | c1 |
|---|---|
| 1 | v11 |
| 2 | v21 |
| 3 | v31 |

| sID | c2 |
|---|---|
| 1 | v12 |
| 2 | v22 |
| 3 | v32 |

| sID | c3 |
|---|---|
| 1 | v13 |
| 2 | v23 |
| 3 | v33 | column-oriented

ETL-LESS ZERO-REDUNDANCY SYSTEM AND METHOD FOR REPORTING OLTP DATA

CROSS REFERENCE TO RELATED APPLICATIONS

The present application claims priority from U.S. Provisional Application No. 60/994,893 filed Sep. 21, 2007 and titled "ETL-Less Zero-Redundancy System and Method for Reporting OLTP Data", which is incorporated herein by reference.

BACKGROUND

The present invention relates to database systems, and in particular, to transactional database systems and reporting database systems.

Unless otherwise indicated herein, the approaches described in this section are not prior art to the claims in this application and are not admitted to be prior art by inclusion in this section.

Business intelligence (BI) systems provide companies with extensive functionalities to gather, analyze and provide access to their data. Data is collected from multiple heterogeneous sources within a company and possibly additional external sources to create an integrated set of data as a comprehensive base of knowledge and for effective reporting.

Current state-of-the-art architectures of BI systems rely on a centralized data warehouse (DW) or multiple decentralized data marts to store the integrated data set. The process of collecting data from the transactional systems and transporting it into a dedicated storage is called extraction, transformation and loading (ETL). It "is by far the most complicated process to be designed and developed in any BI project." [See L. T. Moss and S. Atre, Business Intelligence Roadmap The Complete Project Lifecycle for Decision-Support Applications at page 229 (Addison-Wesley, 2003).] According to Ankorion, the ETL process is traditionally run periodically on a weekly or monthly basis. [See I. Ankorion, Change Data Capture—Efficient ETL for Real-Time BI, DM Review Magazine (January 2005).] It is usually run as a batch job during low system load windows, because transforming and cleansing data that is probably only available in poor quality takes a high amount of resources. This implies that data in the BI system is not always up-to-date, which might pose problems for companies that have to react to issues in real-time, e.g. in the banking business.

Referring to Liang and Yu, not necessarily all data is replicated into the BI system, but only data of interest. [See W. Liang and J. X. Yu, Revisit on View Maintenance in Data Warehouses, in WAIM '01: Proceedings of the Second International Conference on Advances in Web-Age Information Management at pages 203-211 (Springer-Verlag, London, UK, 2001).] Furthermore, data is usually aggregated to achieve a higher data access performance. [See K. Becker and D. D. A. Ruiz, An Aggregate-Aware Retargeting Algorithm for Multiple Fact Data Warehouses, in Yahiko Kambayashi and Mukesh K. Mohania (Wolfram Wöβ, editor), DaWaK, volume 3181 of Lecture Notes in Computer Science (LNCS) at pages 118-128 (Springer-Verlag, Spain, September 2004).] In this case, aggregation levels have to be predefined. This results in some problems. Firstly, information may be queried that has not been replicated into the BI system. Secondly, the system may not able to produce certain levels of detail for a report, which has not been foreseen at the time when the aggregation levels were defined. In such a scenario ad-hoc reports—specific reports that are created and customized by the users themselves—are not entirely possible as the knowledge base is not complete, but is only a filtered version of data stored in the source systems.

While OLTP (on-line transactional processing) systems store up-to-date data, efficient reporting on top of these systems is not practicable due to performance reasons. OLAP (on-line analytical processing) systems provide sophisticated reporting capabilities, but do usually not use up-to-date data: common reporting architectures rely on complex, resource-intensive ETL (extraction, translating and loading) processes that replicate OLTP data into read-optimized data structures in a batch job fashion during low system load times.

SUMMARY

Embodiments of the present invention relate to a computer system that implements a computer program for processing database information for both transacting and reporting and to a corresponding method.

A computer system according to an embodiment of the present invention implements a computer program for processing database information for both transacting and reporting. Said computer program comprises a relational database management system component that stores said database information in a row format and a column-oriented data processing component that stores said database information in a column format.

In response to a database update request, said relational database management system component updates said database information stored in said row format, said relational database management system component notifies said column-oriented data processing component of said database update request, and said column-oriented data processing component updates said database information stored in said column format.

Furthermore, in response to a query request, said column-oriented data processing component generates a query response based on said database information stored in said column format.

Preferred embodiments of a computer system according to the present invention are defined in the dependent claims.

An embodiment of the present invention also relates to a computer-implemented method of processing database information for both transacting and reporting, comprising the steps of storing said database information in a row format, storing said database information in a column format, in response to a database update request, updating said database information stored in said row format, locking said database information stored in said row format, updating said database information stored in said column format, and unlocking said database information stored in said row format after said database information stored in said column format has been updated, and in response to a query request, generating a query response based on said database information stored in said column format.

In a further embodiment, the present invention relates to a computer system that implements a computer program for processing database information for both transacting and reporting, wherein said computer program comprises a relational database management system component that stores said database information in a row format and a plurality of networked computers that implements a column-oriented data processing component that stores said database information in a column format across said plurality of networked computers.

In response to a database update request, said relational database management system component updates said database information stored in said row format, said relational database management system component notifies said column-oriented data processing component of said database update request, and said column-oriented data processing component updates said database information stored in said column format.

Furthermore, in response to a query request, said column-oriented data processing component generates a query response based on said database information stored in said column format.

One feature of an embodiment of the present invention is the elimination of the traditional dichotomy between OLTP (on-line transactional processing) systems and OLAP (on-line analytical processing) systems.

Another feature of an embodiment of the present invention is the elimination of extraction, translating and loading (ETL) procedures.

Another feature of an embodiment of the present invention is that reporting may be performed on the most up to date data.

Another feature of an embodiment of the present invention is that the amount of programming code, as well as the amount of effort devoted to code maintenance, is reduced as compared to the traditional separate OLTP and OLAP systems.

An embodiment of the present invention is directed toward an architecture for reporting directly on top of OLTP data that preserves the short response times of OLAP systems. To do so, data transformations typically carried out during ETL are performed at query-runtime in a column-oriented main memory database. One advantage over traditional reporting architectures is that up-to-date data can be provided and that additional OLAP data stores are no longer required. The architecture is validated with a prototypical implementation on the basis of SAP's ERP (enterprise resource planning) and DW (data warehouse) products. A case study from the field of financial accounting is introduced and used to compare the performance of our prototype to the existing product.

The following detailed description and accompanying drawings provide a better understanding of the nature and advantages of the present invention.

DETAILED DESCRIPTION

Figure 1:
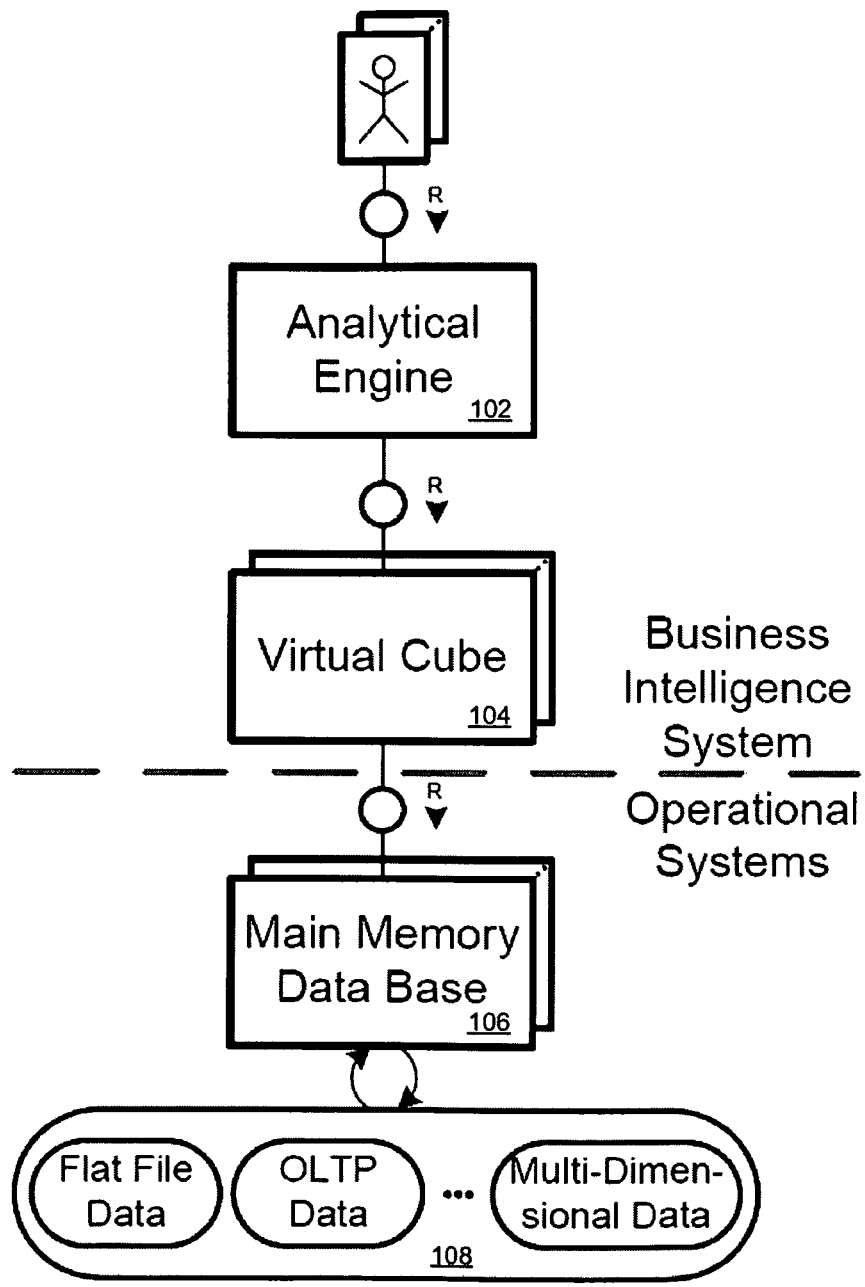
FIG. 1 is a block diagram of a database system according to an embodiment of the present invention.

Described herein are techniques for real-time reporting of financial data. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

The present invention proposes an architecture, which is based on the utilization of main memory technology in combination with a column-oriented data structure. In this architecture data retrieval as well as data insertion performance are accelerated, so analytical as well as transactional systems can work on the same set of data. One embodiment of the present invention aims at omitting the replication of data between the analytical and transactional systems. Specific steps of transformation for a report as part of the former ETL process are executed during its run-time on-the-fly. Keeping only one set of data for both scenarios yields the advantage that the complete set of company data is available and can be used for reporting.

Related Work

An embodiment of the present invention introduces a new, real-time capable architecture for reporting. Thus, it is helpful to understand existing DW architectures. These will, therefore, briefly be described. Afterwards, existing architectures that allow for reporting on transactional data will be discussed.

Common Data Warehouse Architectures

The general architecture of DW systems is described below. Inmon's characteristics for DW systems, i.e. that data in a warehouse must be subject-orientated, integrated, time variant, and non-volatile [Inmon. Building the Data Warehouse, 3rd Edition. John Wiley & Sons, Inc., New York, N.Y., USA, 2002, p. 31], led to an architecture separating operational and analytical data. Data in On-Line Transactional Processing (OLTP) systems is organized according to the relational model (defined by Codd [A Relational Model of Data for Large Shared Data Banks. Communications of the ACM, 13:377-387, June 1970]), i.e. data is highly normalized in order to ensure consistency and to run day-to-day operations on these systems. OLAP systems, in contrast, organize data according to the dimensional model, using for example the star or snowflake schema. The reason for this is mainly the wish to achieve the best query performance. Since OLAP systems are read-only, denormalized data storage is permissible as data consistency is less important than in OLTP systems.

This leads to an architecture as follows. The DW contains an ETL processor which extracts data from various OLTP sources into a staging area, where data transformations for cleansing and integration are applied. Once this process has been completed, the ETL processor stores the data according to a dimensional data storage paradigm, so that an OLAP engine can run queries against this dimensional data store.

With the proliferation of BI technologies, this general architecture has been extended with concepts such as data marts or Operational Data Stores (ODS). Data marts aim at decentralizing the DW in order to optimize performance around certain subject areas [W. H. Inmon. Building the Data Warehouse, 3rd Edition. John Wiley & Sons, Inc., New York, N.Y., USA, 2002]. The downside is that in data mart architectures, the DW no longer provides the one consistent view on all relevant data in an enterprise, which was an original intention of DW systems. ODSs store OLTP data, but use an integrated data schema; i.e. the ETL steps of data mapping and cleansing are applied before moving data into an ODS. The result is increased timeliness of the data on which reporting can be done. This has led to the inclusion of similar features into traditional DW systems, causing the borders between OLTP and OLAP systems to blur. In the following, we will focus on related architectures for reporting on OLTP data.

Latency-Reduced Reporting Architectures

As already mentioned above, the ETL process is the point in DW architectures that (dis-)connects OLTP and OLAP systems. One possible optimization would be to shorten the intervals between ETL runs to a minimum. The main disadvantage of such Microbatch approaches [J. Adzic, V. Fiore, and S. Spelta. Data Warehouse Population Platform. Lecture Notes in Computer Science (LNCS), 2209, 2001] is the resource consumption of the frequent ETL runs: The ETL process should only run in a defined batch window, because the query performance of the DW is dramatically affected during ETL processing time.

In order to achieve real-time reporting on transactional data, data transformation has to be done at query run-time. Therefore, architectures have been proposed that move the data transformation outside of the ETL process. Instead, the transformations are done in the warehouse after extraction and loading. Such processing is called ELT, respectively [L. Moss and A. Adelman. Data Warehousing Methodology. Journal of Data Warehousing, 5:23-31, 2000]. Also, push architectures for ETL have been proposed in order to replace bulk processing with the handling of deltas on a business or database transaction level, cf. [R. Kimball and J. Caserta. The Data Warehouse ETL Toolkit: Practical Techniques for Extracting, Cleaning. John Wiley & Sons, Inc., New York, N.Y., USA, 2004, p. 427]. Kimball further suggests to separate historical data from recent data in a warehouse. The recent data is constantly copied into the so-called real-time partition using the push approach described above. In doing so, the DW can still be optimized for queries on historical data, while recent events in an enterprise are also recorded in the warehouse. Brobst suggests to extend typical message broker infrastructures in a way that they leverage the ETL push architecture described above [S. Brobst. Enterprise Application Integration and Active Data Warehousing. In Proceedings of Data Warehousing 2002, pages 15-23, Heidelberg, Germany, 2000. Physica-Verlag GmbH]. This is done by hooking a DW adapter into the message bus that subscribes to messages which are relevant for the data in the warehouse. Necessary data transformations are done in the warehouse, resembling the concept of ELT, also described above. While the presented approaches come with less data-capture latency than traditional, batch-oriented ETL architectures, changes in the OLTP systems must still be propagated to the DW, where they are harmonized and stored redundantly using dimensional data models. In order to have a real-time view on the enterprise in reporting, the replication between OLTP and OLAP systems must be reduced to the minimum.

The notion of virtual ODS, as opposed to the traditional, physical ODS discussed above, describes a pull-oriented DW architecture which gathers the requested information at query run-time. The ODS is virtual in the sense that it translates DW queries into downstream queries to OLTP or third-party systems without persisting any data. Inmon argues that virtual ODS architectures are of limited use when the data in the source systems is not integrated [W. H. Inmon. Information Management: World-Class Business Intelligence. DM Review Magazine, March, 2000]. This is due to the fact that virtual ODS systems do not provide ETL transformations at run-time, which would be necessary to provide for data integration. The reason is that ETL transformations are costly and there is, thus, a tradeoff between the extent of functionality in virtual ODS and end-user response times. However, virtual ODS is the concept which comes closest to the reporting approach for transactional data.

High-Performance Reporting on OLTP Data

FIG. 1 is a block diagram of a database system 100 according to an embodiment of the present invention, using the Fundamental Modeling Concepts (FMC) block diagram notation [A. Knöpfel, B. Gröne, and P. Tabeling. Fundamental Modeling Concepts: Effective Communication of IT Systems. John Wiley & Sons, Inc., May 2006]. The embodiment of FIG. 1 introduces an architecture for reporting where data is not stored in any other system apart from the transactional systems. As a result, no replication into a DW system occurs, but data is accessed directly in the transactional systems when queried.

The database system 100 includes an analytical engine 102, a virtual cube 104, a main memory data base 106, and a data store 108. The data store 108 includes a flat data file, OLTP data, multi-dimensional data, and other data. The analytical engine 102 and the virtual cube 104 are components of the business intelligence system, and the main memory data base 106 and the data store 108 are components of the operational systems.

As a basis the database system 100 uses the main memory database 106 to access all data. Using main memory technology is one aspect of the solution according to an embodiment of the present invention to provide short response times for reporting directly on transactional data. Another aspect is to use a data structure that provides fast read access as well as efficient write access.

On-The-Fly Data Transformation

The analytical engine 102 accesses data through the virtual cube 104. The virtual cube 104 may provide the same interface for analysis as given by standard cubes in DW systems. This includes drilling between levels of hierarchy as well as slicing and dicing regarding different metrics. In an implementation according to an embodiment of the present invention, the virtual cube 104 plugs into the OLAP engine of SAP BI. In consequence, all the reporting front-ends supported by SAP BI can be used to launch queries against the OLTP data. Available front-ends include HTML reports and Microsoft Excel-based reports. In the case of SAP BI, predefined queries may be run inside these reporting front-ends. These queries can be specified graphically (using a query design tool) or using Multidimensional Expressions (MDX) [see <http://msdn2.microsoft.com/en-us/library/ms 145506.aspx>].

In comparison with traditional cubes in DW systems, the virtual cube 104 does not store any data. Instead, the virtual cube 104 is a collection of functions that are executed during the run-time of a report. The virtual cube 104 maps the reporting interface it exposes to calls against the underlying main memory database 106 that contains the OLTP data. The queries are sent to the OLAP engine (analytical engine 102), which then executes OLAP queries against the virtual cube 104. The virtual cube 104 transforms the incoming OLAP queries into queries against the used main memory database 106 with the OLTP data. Due to providing the OLTP data to the OLAP engine (analytical engine 102) directly, data queried by reports is always up-to-date. The virtual cube 104 may include a virtual cube interface component that maps an on-line analytical processing query into an aggregation call, and that sends the aggregation call to a column-oriented data processing component as a query request.

Since the OLTP data in the main memory database 106 may be on the highest possible level of granularity, which means that the data does not contain aggregates, the virtual cube 104 maps most OLAP queries to aggregation calls against the main memory database 106. Therefore, aggregations needed for a certain level within the hierarchy are created on-the-fly. No further storing of totals is needed and the data explosion problem where every possible aggregation value is calculated in advance and stored in the cube structure (of the virtual cube 104) is avoided.

During a performance evaluation of a case study scenario, which will be presented in more detail below, 500,000 totals that have been created on the basis of 10 million line items were encountered. A ratio of 1 totals to 20 line items seems to be inefficient. As will be discussed later, the granularity is, for example, too high for creating a balance sheet report: there, the totals read from the database still have to be aggregated in the source code afterwards. The original idea to read exactly the total necessary for the report, without further calculations and accessing multiple fields in the database, is not met here. The low ratio is thus inadequate regarding storage space and update performance. If data is inserted or updated, multiple totals must be updated as well, which usually happens in the same database transaction in financial accounting to keep a consistent view. As a result, the actual database transaction is protracted and many rows are locked exclusively for the write access in case of row-level locking. Not storing any totals reduces the management overhead and, in addition, speeds up database transactions with write access of line items.

Insert-Only Characteristics of Financial Data

So far the disadvantages of having two physically separate data stores for OLTP and OLAP applications have been discussed. However, among the big benefits of replicating the data from an operational to a DW system are that OLAP and OLTP operations are not competing for resources (i.e. locks) on a single copy of the data; this contention is usually significant since OLAP operations typically touch a lot of data. This is especially the case if the data is not pre-aggregated in separate copies and if ACID (atomicity, consistency, isolation, durability) properties for the OLTP transactions are required, which is particularly important for financial data. Another benefit of copying the data to the DW is that many reports take history, i.e. changes of the data over time, into account. OLTP data usually only represents the latest consistent snapshot of the data.

A reporting approach operating on top of OLTP data has to deal with both the contention and the history problem. In the following, it will be described how both problems can be solved by exploiting the insert-only characteristics of financial data.

Financial accounting, which is a main purpose of the kinds of OLTP systems, is an activity which requires to record every change of the data. For example, if the value of a fixed asset has to be adjusted for deprecation reasons, the value is not updated; instead, a correctional posting is created which "moves" the deducted funds from one account to another. This posting would appear in the bookkeeper's journal as a new line in the fixed assets accounts, saying that there is a deduction of a certain value, and another new line in the deprecations account where this value is added. From a database perspective, data is either read or inserted. Update and delete operations are not allowed in this model, because "accountants don't use erasers", as Pat Helland has recently put it [see <http://blogs.msdn.com/pathelland/archive/2007/06/14/accountants-don-t-use-erasers.aspx>]. Database locks are, thus, no longer required. The combination of an insert-only data model for OLTP data and using a main memory database 106 as the only one persistent storage for this data allows for direct reporting on top of the OLTP data with short response time during normal operations of the OLTP system. Temporal databases such as Google's Bigtable [F. Chang, J. Dean, S. Ghemawat, W. C. Hsieh, D. A. Wallach, M. Burrows, T. Chandra, A. Fikes, and R. E. Gruber. Bigtable: A Distributed Storage System for Structured Data. In USENIX'06: Proceedings of the 7th conference on USENIX Symposium on Operating Systems Design and Implementation, pages 15-15, Berkeley, Calif., USA, 2006. USENIX Association], for example, provide inherent support for insert-only data models, because they treat updates of a field as an insert operation with a timestamp associated.

As stated above, an embodiment of the present invention is somewhat comparable to virtual ODS, where DW queries are redirected against OLTP systems without physically persisting any data. In contrast to an embodiment of the present invention, virtual ODS is a concept for direct access to snapshot OLTP data, i.e. historical data is not taken into account. Because of the insert-only data model for OLTP, described above, an embodiment of the present invention does inherently support reports on historical data: Since an append-only journal is kept for every account, previous values of an account are not lost, but can be reconstructed.

One Data Store for all Scenarios

The entire data set may be kept in the main memory 106 to ensure short response times. According to Yu [C. Yu. High-Dimensional Indexing: Transformational Approaches to High-Dimensional Range and Similarity Searches, volume 2341/2002. Springer-Verlag New York, Inc., Secaucus, N.J., USA, 2002, p. 137] the assumption that databases are too large to fit into main memory 106 is increasingly being challenged as main memory gets cheaper and larger. On the other hand, Gantz et al. [J. F. Gantz et al. The Expanding Digital Universe: A Forecast of Worldwide Information Growth Through 2010. IDC white paper—Sponsored by EMC, <http://www.emc.com/about/destination/digital_universe/>, March 2007] argue that organizations worldwide will severely suffer from what they call "information explosion" over the next few years. In 2007 more information is created already without enough capacity available to store it. 95 percent of the information creating the explosion, however, is unstructured data, e.g. music, photos, videos, digital telephony and television, sensor data, or e-mail.

The financial transactional data of the past 5 years of a medium sized company were analyzed. The size of the company data was about 20 GB of space in the file system. After transforming it into the data structure of the main memory database 106 and compressing it, its size was approximately 1 GB. Consequently, keeping the entire transactional data set completely in main memory seems feasible at least for small and medium sized companies.

Figures 2, 3:
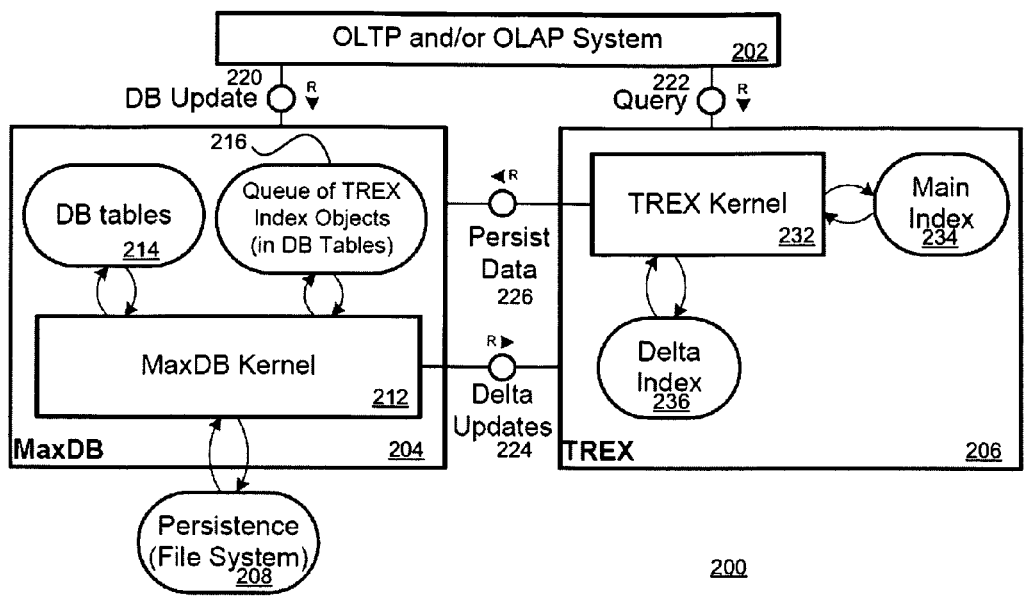
FIG. 2 is a block diagram of a database system according to an embodiment of the present invention.
FIG. 3 illustrates an example of row oriented versus column oriented data storage.

SAP's Text Retrieval and Information Extraction engine (TREX) was used to implement the main memory storage system 106. TREX has originally been developed as a text search engine for indexing and fast retrieval of unstructured data. The solution according to an embodiment of the present invention implies the usage of TREX as a fully fledged main memory database. TREX, however, does not yet entirely support the ACID (Atomicity, Consistency, Isolation, Durability) properties, which however is a prerequisite for the transactional scenario. Therefore, TREX was combined with a traditional relational database management system (RDBMS). FIG. 2 shows how TREX is integrated with MaxDB and how read and write access is distributed between TREX and MaxDB.

FIG. 2 is a block diagram of a database system 200 according to an embodiment of the present invention. The database system 200 includes an OLTP (and/or OLAP) system 202, a relational database management system 204 (also referred to as the MaxDB RDBMS, as a specific implementation of the RDBMS 204), column-oriented data processing system 206 (also referred to as the TREX component, as a specific implementation of the CODPS 206), and a file system 208. The OLTP system 202 interacts with the RDBMS 204 via a DB update 220. The OLTP system 202 interacts with the CODPS 206 via a query 222. The RDBMS 204 interacts with the CODPS 206 via a delta updates access 224. The CODPS 206 interacts with the RDBMS 204 via a persist data access 226.

Requests that change data or insert new data are handled by the MaxDB 204, which ensures the ACID properties. The MaxDB 204 includes a database kernel 212 (in this specific implementation, also referred to as the MaxDB kernel), database tables 214, and a queue of index objects 216 (in database tables). The database kernel 212 interacts with the file system 208. The MaxDB Kernel 212 stores the changes in the database tables 214 and manages queue tables (in the queue 216) for TREX 206. These queue tables 216 contain the information, which data has been changed or inserted. TREX 206 is notified about the changes and can update its own data with the help of the queue tables 216. This happens within the same database transaction. Accordingly, TREX 206 and MaxDB 204 share a consistent view of data.

Database queries and analytical reports (note the query 222) in return are directly handled by TREX 206. The CODPS 206 includes a kernel 232 (in this specific implementation, also referred to as the TREX kernel), a main index 234, and a delta index 236. TREX 206 arranges its data in the main index 234. The main index 234 holds the same data as the database tables 214 in MaxDB 204, though tables are stored differently. In the RDBMS 204, tables are stored row-wise. In TREX 206 they are stored column-wise. The advantage of this data structure is discussed in the next section. Since the main index 234 is highly optimized for read access, TREX 206 holds the delta index 236 to allow fast data retrieval while concurrently updating its data set. All updates and inserts taken from the queue tables 216 are collected in the delta index 236. When responding to a query, data in the delta index 236 as well as the main index 234 is accessed to provide a consistent view of the entire data set compared with the database tables 214 of MaxDB 204. The delta index 236 may not be as compressed and optimized for read access as the main index 234. Therefore, it should not exceed a size limit as determined by the hardware limits of the implementing system. Upon reaching a criterion such as a certain size or in pre-set time intervals the TREX kernel 232 (or a monitoring component thereof) merges the delta index 236 with the main index 234. Merging the delta index 236 with the main index 234 neither blocks read nor write access of data within TREX 206. The column-oriented data processing system 206 may be implemented on one or more computer systems that may be networked together.

In one embodiment of the present invention data is stored redundantly in database tables 214 and TREX's data structure 234 only to ensure the ACID properties. In an alternative embodiment this redundancy is be eliminated. OLTP read and write access as well as OLAP reporting will then use the data set of TREX 206. As a prerequisite for OLTP write access, TREX 206 is modified to fully support the ACID properties. It was analyzed which ACID properties TREX 206 is able to support and how TREX 206 may support them entirely: Atomicity is implemented in TREX using so-called multi index calls that resemble the two-phase-commit protocol in distributed database systems. Consistency is supported by monitoring constraints and aborting and rolling back transactions if any rules are broken. Log files ensure durability. Isolation is the only property that is currently not directly implemented in TREX 206. TREX 206 only provides the isolation level called read committed, which means that lost updates or phantoms may occur in the data set. In one embodiment of the present invention, this may be solved by serializing transactions through application locks. In another embodiment the architecture may be built upon another existing column-based main memory storage system, like MonetDB, C-Store, or Google's Bigtable.

Furthermore, the implementation of standardized interfaces for database access, e.g. SQL, may be included in an embodiment of the present invention. A prototypical SQL interface for TREX 206 was implemented as a proof of concept. TREX 206 itself provides programming interfaces for ABAP™ language, C++ language and Python language. Simple queries including aggregation functions, like SUM, MIN, MAX, AVG, COUNT, grouping and sorting of columns, and basic conditional processing are possible.

However, since main memory is volatile at least one persistent storage 208 besides the main memory data set may be used for backup in further embodiments. After system crashes the main memory data structure will be rebuild from there. As aforementioned, data in TREX 206 is stored differently compared to data storage in traditional RDBMS 204. The data structure allowing fast access for reporting on transactional data without the need to aggregate in advance is discussed in the following.

Data Structures and Compressing Techniques

Companies create huge amounts of data during their daily operations. Two different areas for gaining performance are targeted in this section. Firstly, performance is achieved by exploiting specific data structures. The star and snowflake schema of current DW architectures provide fast access of key performance figures grouped by dimensions. They are optimized for performance by avoiding large and complicated joins as would be the case when using the relational data model in third normal form for analytics. However, the star schema is relatively inflexible concerning unpredictable reporting behavior, because dimensions are defined before run-time. Additionally, changes of requirements usually result in changes of the schema, too, or a redesign of the entire schema [W. H. Inmon. When Are Star Schemas Okay in a Data Warehouse? B-Eye: Business Intelligence Network—The Global Vision for BI and Beyond, http://www.b-eye-network.com/view/5626, July 2007].

Secondly, keeping data entirely in main memory is another way to achieve an adequate query performance. Main memory space, although growing in size, is still much more expensive and restricted in size than is disk space.

Therefore, to fit such an amount of data in main memory, compression algorithms with a maximum compression rate and a minimum negative impact on insertion and retrieval performance may be utilized.

Column-oriented

Since only one data storage is used in the proposed architecture, a data structure capable of providing appropriate read and write access performance for transactional scenarios as well as retrieval performance for analytical scenarios may be used. Schemes used in the analytical scenario being partly denormalized are not viable in this case as they do not perform well in transactional scenarios. Instead of denormalization for fast retrieval access, the approach of an embodiment of the present invention goes in the opposite direction and takes normalization a step further from the relational data model. To avoid complex joins database tables are not denormalized and thereby pre-calculated joins achieved, but the tables are broken down to column level. The concept of "turning the tables" has been introduced more than 20 years ago. In 1985 Copeland and Khoshafian introduce a fully decomposed storage model (DSM) [G. P. Copeland and S. Khoshafian. A Decomposition Storage Model. In S. B. Navathe, editor, Proceedings of the 1985 ACM SIGMOD International Conference on Management of Data, Austin, Tex., May 28-31, 1985, pages 268-279. ACM Press, 1985]. Each column is stored by itself (see FIG. 3) and the logical table structure is preserved by the introduction of surrogate identifiers.

FIG. 3 illustrates an example of row oriented versus column oriented data storage. Row oriented storage may be viewed as a single table with a grid of data. Column oriented storage may be viewed as multiple tables (one per column) with the surrogate identifier sID duplicated in each table.

The storage of surrogate identifiers sIDs leads to extra storage consumption, which can be overcome, for example, by using the positional information of the attributes in the column as identifier. Even more elaborate approaches exist that avoid the redundant storage of attribute values, e.g. null values, or in the case of columns where only a small amount of differing values exists. The idea of storing data in columns instead of rows has been implemented in multiple projects, for example, MonetDB [P. Boncz. Monet: A Next-Generation DBMS Kernel for Query-Intensive Applications. PhD thesis, Universiteit van Amsterdam, Amsterdam, Netherlands, May 2002], C-Store [M. Stonebraker et al. C-Store: A Column-oriented DBMS. In VLDB '05: Proceedings of the 31st International Conference on Very Large Data Bases, pages 553-564. VLDB Endowment, 2005], or Google's BigTable [F. Chang, J. Dean, S. Ghemawat, W. C. Hsieh, D. A. Wallach, M. Burrows, T. Chandra, A. Fikes, and R. E. Gruber. Bigtable: A Distributed Storage System for Structured Data. In USENIX'06: Proceedings of the 7th conference on USENIX Symposium on Operating Systems Design and Implementation, pages 15-15, Berkeley, Calif., USA, 2006. USENIX Association] to name a few.

Column-oriented storage uses the observation that not all columns of a table are usually queried in a report or are needed to create the result. Compared to the relational model used in databases where all columns of two tables even those that are not necessary for the result are accessed the column-oriented approach yields a more lightweight solution. Only the columns needed directly for creating the result have to be accessed.

In column-oriented data structures, compared to traditional analytical or transactional schemes the number of joins to compose the same information is higher, but the joins themselves have a lower complexity and need to access less data. Accessing single columns for values and computing joins can be massively parallelized when distributing data on multiple machines. Two basic approaches for the distribution of data onto multiple machines exist, as shown in FIG. 4.

Figure 4:
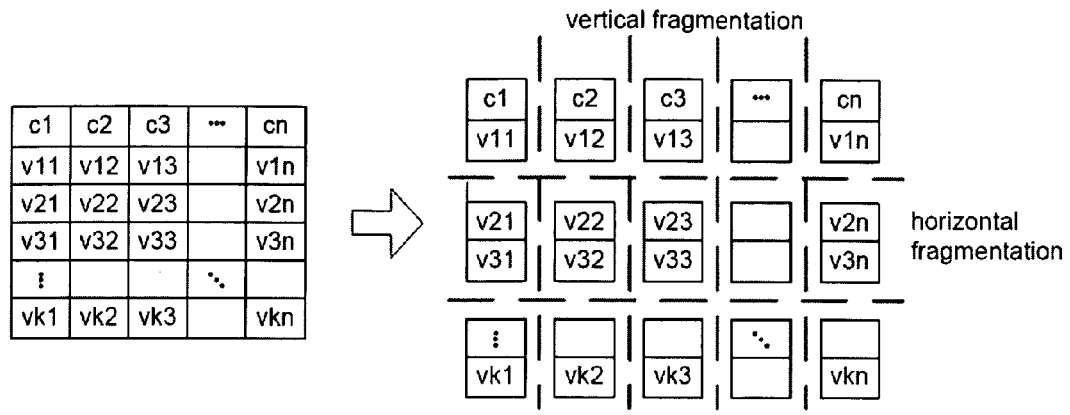
FIG. 4 illustrates an example of horizontal fragmentation and vertical fragmentation.

FIG. 4 illustrates an example of horizontal fragmentation and vertical fragmentation. Horizontal fragmentation separates tables into sets of rows and distributes them on different machines in order to perform computations in parallel. It has been introduced, for example, to solve the problem of handling tables with a great number of rows, like fact tables in DW systems [A. Y. Noaman and K. Barker. A Horizontal Fragmentation Algorithm for the Fact Relation in a Distributed Data Warehouse. In CIKM '99: Proceedings of the Eighth International Conference on Information and Knowledge Management, pages 154-161, New York, N.Y., USA, 1999. ACM Press]. Column-orientation facilitates vertical fragmentation, where columns of tables are distributed on multiple machines. TREX 206 uses both approaches simultaneously [T. Legler, W. Lehner, and A. Ross. Data Mining with the SAP NetWeaver BI Accelerator. In VLDB '06: Proceedings of the 32nd International Conference on Very Large Data Bases, pages 1059-1068. VLDB Endowment, 2006]. Besides the advantage of parallel computation, through fragmentation the entire set of data can be kept in memory without the need of using high-end hardware technology.

Tuning the Columns

Compression is a solution to fit more data into limited memory space. Compressing data when writing and decompressing when reading, however, puts more load on the CPU. A trade-off between the increase of processing time when compression is used and increased memory space usage without compression may be balanced according to an embodiment of the present invention. However, a widening gap between the growth rate of CPU speed and memory access speed can be observed [N. R. Mahapatra and B. Venkatrao. The Processor-Memory Bottleneck: Problems and Solutions. Crossroads, 5(3):2, 1999]. While CPU speed grows at a rate of 60 percent each year, the access time to memory (DRAM) increases less than 10 percent per year. This growing discrepancy compensates for the usage of data compression by diverting some of the processing power to compression and decompression while increasing the information density and thereby decreasing the amount of memory access.

Data compression techniques exploit redundancy within data and knowledge about the data domain for optimal results. Column-oriented storage in this case contributes to optimize compression. Attributes within one column are of the same type of data or structure and therefore bear strong similarities among one another. Abadi et al. [see D. Abadi, S. Madden, and M. Ferreira, Integrating Compression and Execution in Column-Oriented Database Systems, in SIGMOD '06: Proceedings of the 2006 ACM SIGMOD international conference on Management of data, pages 671-682 (New York, N.Y., USA, ACM Press 2006)] characterized and evaluated a set of compression techniques working particularly well with column-oriented storage, e.g. run-length encoding (RLE) or bit-vector encoding. In RLE the repetition of values is compressed to a (value, run-length) pair. For example the sequence "aaaa" is compressed to "a[4]". This approach is especially suited for sorted columns with little variance of attribute values. For the latter if no sorting is to be applied, bit-vector encoding is well suited. Many different variants of bit-vector encoding exist. Essentially, a frequently appearing attribute value within a column is associated with a bit-string, where the bits reference the position within the column and only those bits with the attribute value occurring at their position are set. The column is then stored without the attribute value and can be reconstructed in combination with the bit-vector. Approaches that have been used for row-oriented storage are also still applicable for column-oriented storage. One example is dictionary encoding, where frequently appearing patterns are replaced by smaller symbols.

Currently, TREX 206 uses integer and dictionary encoding in combination with bit-vector encoding. Each existing value for an attribute is stored in a dictionary table and mapped to an integer value. Within the columns only the integer values are stored. As a first advantage attribute values existing multiple times within a column reference the same row within the dictionary table. Thereby redundant storage of attribute values is eliminated and only redundancy of the integers referencing the same attribute value occurs. The second advantage is that the integers used for encoding consume less storage space than the actual attribute values.

Due to the compressed columns, the density of information in relation to the utilized memory space is increased. As a result more relevant information can be loaded into the cache for processing at one time. Less load actions from memory into cache are needed in comparison to row storage, where even columns of no relevance to the query are loaded into the cache without being used.

Additional Embodiments

One important task in traditional DW projects is defining the process how data is extracted from various sources and then integrated in the DW. The ETL process comprises activities such as accessing different source databases, finding and resolving inconsistencies among the source data, transforming between different data formats or languages, and loading the resulting data into the DW. One embodiment of the present invention aims at moving the ETL activities to query runtime. When doing so, it is probably most challenging to map the transformation steps in ETL processes to operations which can be efficiently computed on-the-fly using main memory technologies. The case study that was presented contained only one type of transformation activity: aggregation. In order to be able to provide all different kinds of reports directly on top of OLTP systems, other types of transformation activities must be taken into account. Transformation activities can be of atomic or composed nature. An example from the field of controlling would be to show a list containing the opening and closing balance of an account from January to December of a given year: For each month m, an aggregation has to be done on only those line items carrying a date between January 1st and the last day of m. The result is then both the closing balance of m and the opening balance of m+1. In this example, the sum operator (i.e. the aggregation) would be an atomic transformation. A composed transformation is used to model the process of creating all opening and closing balances. For every complex report, such workflow-like models could be used for describing the transformations. Simitsis, Vassiliadis, and Sellis treat ETL processes as workflows in order to find optimizations [A. Simitsis, P. Vassiliadis, and T. Sellis. State-Space Optimization of ETL Workflows. IEEE Transactions on Knowledge and Data Engineering, 17(10):1404-1419, 2005]. Their research is, however, aimed at optimizing traditional, batch job-like ETL processes. Workflow models for on-the-fly ETL processes have not been investigated, and is thus one opportunity for a further embodiment of the present invention. The corresponding tasks include the identification of complex reporting scenarios and the complex transformations they require. An adequate abstraction may then be found for these transformations, so that they can be generalized to build ETL workflows with them. Then, efficient implementations may be found for the identified transformations.

According to an embodiment described above, the main memory database 206 (TREX) is accessed using SQL. Since SQL is a language for set-based retrieval of data, it is not suited for the retrieval of hierarchically structured data as it is stored in OLAP systems. For this purpose MDX is typically used, which is supported by most databases tailored for OLAP environments. Having in mind that composed transformation activities could be used to describe the transformations between OLTP data and reports, a further embodiment extends languages like MDX or XQuery with composed transformation constructs.

According to an embodiment described above, the embodiment uses SAP TREX as the main memory database 206 that stores the OLTP data. However, other database products with similar characteristics, such as column-orientation, exist. According to further embodiments, these other database products such as MonetDB and Vertica may be used.

Figure 6:
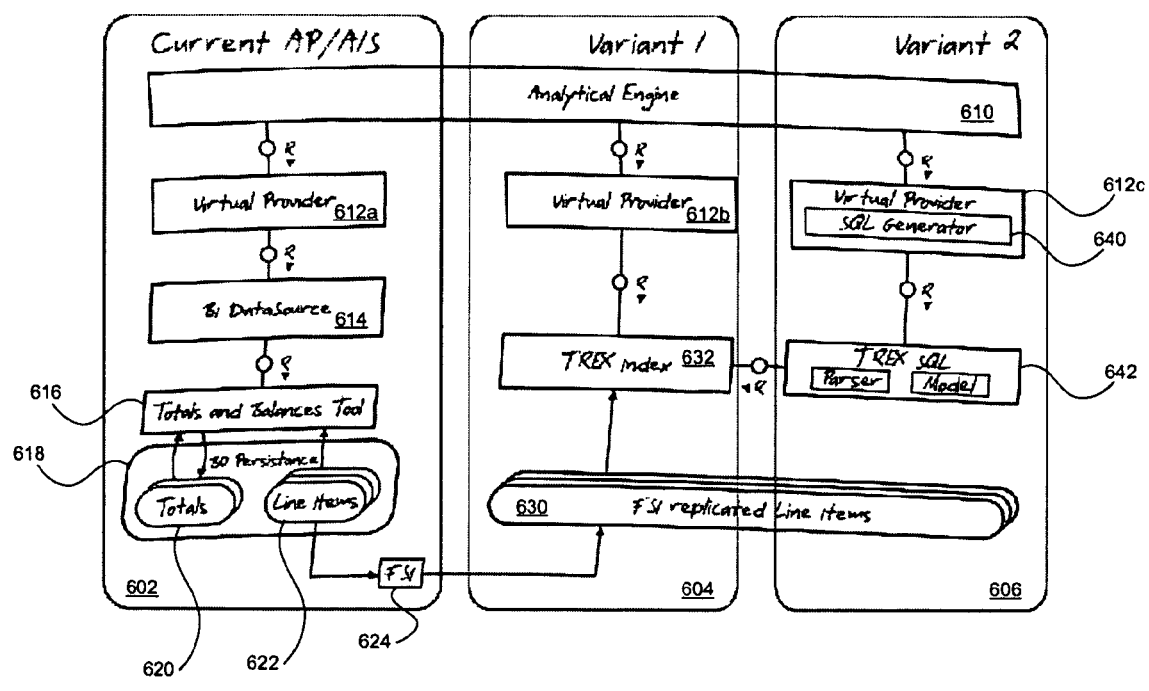
FIG. 6 illustrates a database system according to an embodiment of the present invention.

Related to these additional embodiments, note the SQL generator 640 and the column-oriented SQL module 642 (see FIG. 6).

Figure 5:
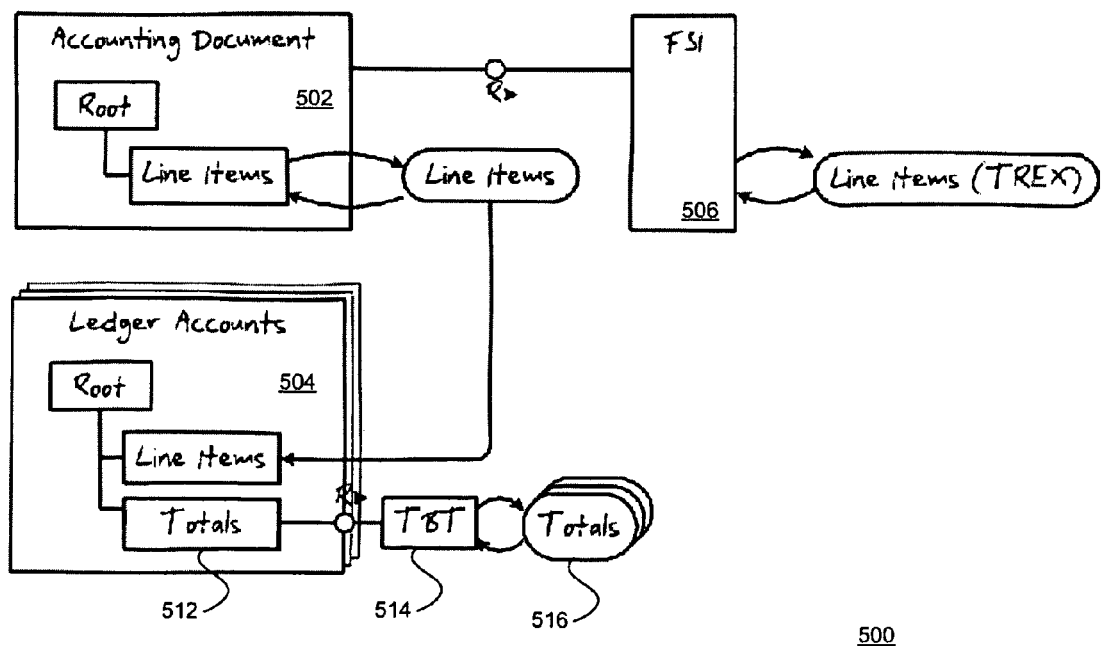
FIG. 5 illustrates a database system according to an embodiment of the present invention.

FIG. 5 illustrates a database system 500 according to an embodiment of the present invention. The database system 500 includes an accounting document 502, ledger accounts 504, and a fast search infrastructure 506. The accounting document 502 and ledger accounts 504 are specific examples of data files in the data store 108 managed by the main memory data base 106 (see FIG. 1). The fast search infrastructure 506 corresponds to aspects of the database system 200 (see FIG. 2) as will be more apparent from the following description and subsequent figures.

The accounting document 502 includes a root object and accounting line items. A user may interact with the accounting document 502 to add new line items. The line items then populate the ledger accounts 504 in accordance with the root object of the ledger accounts 504.

The fast search infrastructure 506 interacts with the accounting document 502 to populate the line items into a column-oriented data processing system (such as TREX 206, see FIG. 2), and as further detailed below.

According to a further embodiment of the present invention, the Totals object 512, the TBT object 514, and the Totals object 516 (and their associated connections) are omitted. They may be omitted, for example, when the fast search infrastructure 506 is handling queries.

FIG. 6 illustrates a database system 600 according to an embodiment of the present invention. The database system 600 includes an application suite 602 (also referred to as the current AP/A1S or BuisinessByDesign in an embodiment that implements those specific applications suites from SAP) and two column-oriented systems 604 (also referred to as variant 1) and 606 (also referred to as variant 2). It is not necessary in a particular embodiment to include both the system 604 and the system 606; one is sufficient. An analytical engine 610 is common between the application suite 602 and the two options 604 and 606. The analytical engine 610 interacts with a virtual provider 612a (a component of 602), 612b (a component of 604), and 612c (a component of 606). The virtual provider 612a interacts with a business intelligence (BI) datasource 614. The BI datasource 614 interacts with a totals and balances tool 616. The totals and balances tool 616 interacts with a business object (BO) persistence 618. The BO persistence 618 includes totals 620 and line items 622. A fast search infrastructure (FSI) 624 replicates the line items 622 to the options 604 and 606 as FSI replicated line items 630. Note that aspects of the database system 600 correspond to those of the database system 200 (see FIG. 2 and related description).

The column-oriented system 604 includes an index 632 (also referred to as a TREX index in an embodiment that uses TREX as a specific implementation of the column-oriented system 604). The FSI replicated line items 630 populate the index 632. The virtual provider 612b interacts with the index 632.

The column-oriented system 606 is similar to the column-oriented system 604, with the following additions: a SQL generator 640 and a column-oriented SQL module 642 (also referred to as a TREX SQL in an embodiment that uses TREX as a specific implementation of the column-oriented system 606). The SQL generator 640 is a component of the virtual provider 612c. The SQL generator 640 operates as discussed above regarding the additional embodiments.

The column-oriented SQL module 642 includes a parser component and a model component. The column-oriented SQL module 642 interacts with the virtual provider 612c and the index 632. The column-oriented SQL module 642 operates as discussed above regarding the additional embodiments.

Figure 7:
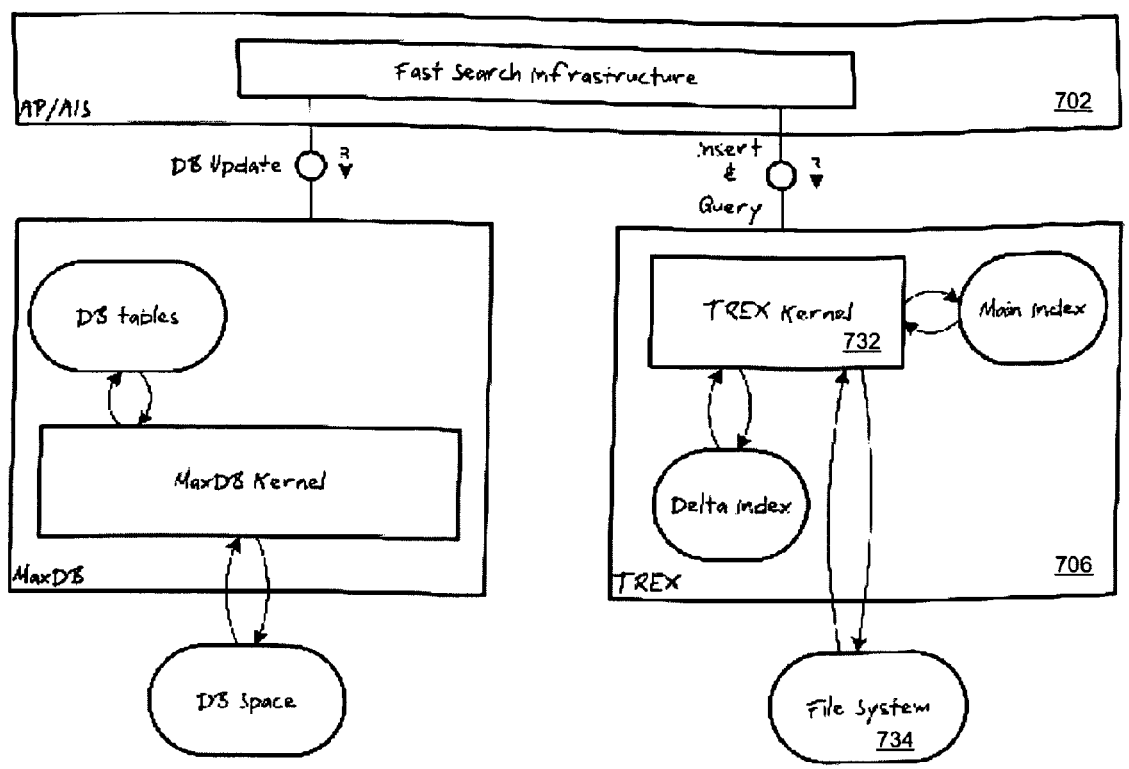
FIG. 7 illustrates a database system according to an embodiment of the present invention.

FIG. 7 illustrates a database system 700 according to an embodiment of the present invention. The database system 700 is similar to the database system 200 (see FIG. 2). The duplicative details are omitted (for brevity) with the following differences. The application suite 702 (also referred to as AP/A1S or BuisinessByDesign in an embodiment that implements those specific applications suites from SAP) corresponds to the OLTP (and/or OLAP) system 202. A column-oriented data processing system 706 (also referred to as the TREX component, as a specific implementation of the CODPS 706) interacts with the application suite 702 via inserts and queries. A kernel 732 (in this specific implementation, also referred to as the TREX kernel) interacts with a file system 734.

Figure 8:
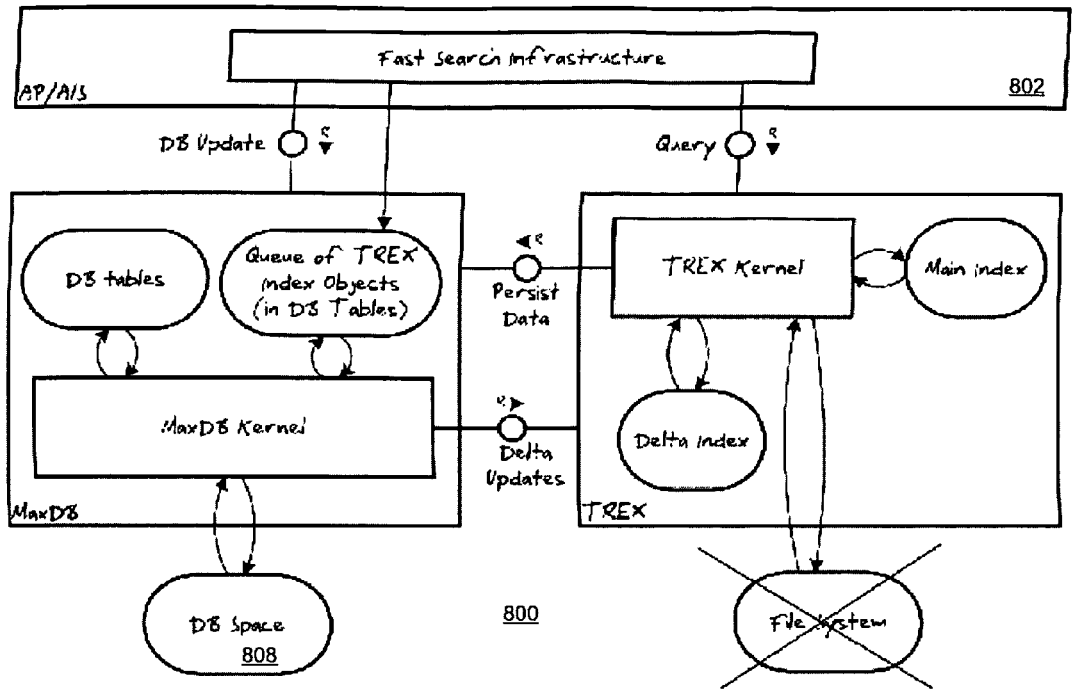
FIG. 8 illustrates a database system according to an embodiment of the present invention.

FIG. 8 illustrates a database system 800 according to an embodiment of the present invention. The database system 800 is similar to the database system 200 (see FIG. 2). The duplicative details are omitted (for brevity) with the following differences. The application suite 802 (also referred to as AP/A1S or BuisinessByDesign in an embodiment that implements those specific applications suites from SAP) corresponds to the OLTP (and/or OLAP) system 202. A database (DB) space 808 corresponds to the file system 208 (see FIG. 2). As compared to the database system 700 (see FIG. 7), note that the database system 800 omits the file system and its associated connections (shown but crossed out), as compared to the file system 734 in FIG. 7.

Figure 9:
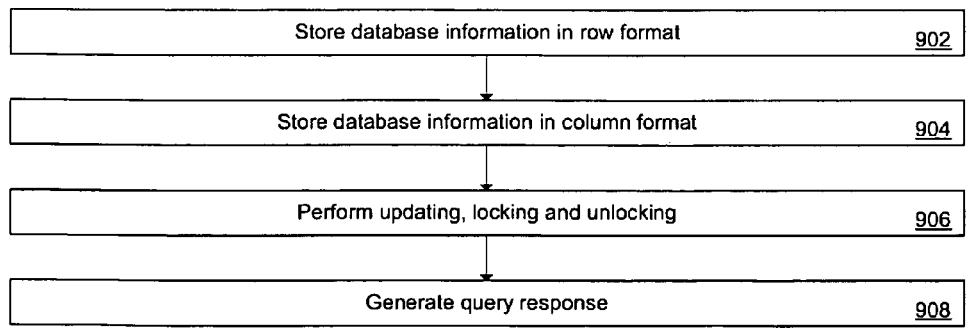
FIG. 9 is a flow diagram of a method of data processing according to an embodiment of the present invention.

FIG. 9 is a flow diagram of a method of data processing 900 according to an embodiment of the present invention. The method 900 is directed toward processing database information for both transacting and reporting. The method 900 may be performed by an embodiment of the present invention such as the database system 200 (see FIG. 2).

In step 902, database information is stored in a row format. The database information may be stored in, for example, the database tables 214 (see FIG. 2). A relational database management system component such as the relational database management system 204 (see FIG. 2) may manage the storage operation.

In step 904, the database information is stored in a column format. The kernel of a column-oriented data processing component (such as the kernel 232 and the TREX component 206, see FIG. 2) may manage this storage operation, using a main index and a delta index (such as the main index 234 and the delta index 236, see FIG. 2).

In step 906, in response to a database update request, various updating, locking and unlocking procedures are performed, as follows. The database information stored in the row format is updated. A relational database management system component such as the relational database management system 204 (see FIG. 2) may manage the update operation. The database information stored in said row format is locked. A relational database management system component such as the relational database management system 204 (see FIG. 2) may manage the locking and may notify a column-oriented data processing component (such as the kernel 232 and the TREX component 206, see FIG. 2) of the database update request. While the lock is in place, the database information stored in said column format is updated. This may be accomplished by the relational database management system component notifying the column-oriented data processing component that, for example, the lock is active or the update request was acted upon. The database information stored in the row format is unlocked after the database information stored in the column format has been updated. The column-oriented data processing component may perform the updating and then may notify the relational database management system component that the updating has been performed.

In step 908, in response to a query request, a query response is generated based on the database information stored in said column format. The column-oriented data processing component may receive the query request and may generate the query response.

Performance Evaluation

For validating the reporting architecture according to the present invention, the performance of a prototypical implementation was benchmarked against the existing SAP DW product.

In order to establish a setting in which the existing DW product and the prototype are comparable, focus was laid on use-cases where the DW has to access OLTP data. While several scenarios in the field of financial accounting have been investigated in the course of the project, only one case study is reported in the following.

The case study contains two use cases which represent a small subset of the balance sheet report. Managers use the balance sheet report not only at the end of an accounting period, but also to run "what-if simulations" of what the balance sheet would look like if the current period would end on the day the query is run. The first use case is to select the (credit and debit) totals for all accounts of a company in a period, which is one of the main steps in balance sheet creation. The second use case is to select the debit and credit totals for one specific account and period. Totals of specific accounts are frequently checked in order to get an overview of certain types of spending, earnings, and special assets of a company.

The DW system has to collect the totals of the accounts from the Enterprise Resource Planning (ERP) system (e.g. SAP Business ByDesign). The ERP system creates pre-aggregated totals on the basis of the line items, which it manages using a dedicated database table. The reason for storing these totals is that they carry a specific meaning in the context of financial accounting and are therefore often queried. The pre-aggregation of totals resembles a classical OLAP setting, because data in DW systems is typically pre-aggregated. In the chosen balance sheet scenario, the totals need to be on a very high level of aggregation. The totals stored by the ERP system are, however, on a more fine-grained aggregation level. In order to produce the balance sheet, an additional aggregation step must thus be performed after the data has been read from the database.

Yet, the performance figures that we present here do not take this additional aggregation time into account: while also end-to-end performance tests have been carried out, that consider the time consumed by the all involved components as well as the network time, the focus here is on the data access layer. Thus, the response time of the database underlying the ERP system was measured when retrieving the totals from the respective table to the time for performing an on-the-fly aggregation of the line items using the main memory-based approach presented above. For the first use case (retrieving all totals), the ERP database (MaxDB 204) needs to run a full table-scan against the totals table, as does the main memory database (TREX 206) on the line item level. The second use case (retrieving few specific totals) yields a cache-hit in MaxDB, while TREX still needs to perform a full scan on the "amount" column of the table containing the line items.

The test data used for the measurements was taken from a medium enterprise in the brewery industry. Their accounting data for one fiscal year (roughly 36 million accounting document line items) were taken, the statistical distribution of the values in the corresponding table analyzed, and from that different test data sets generated. The data sets are characterized by the number of accounting documents, the total number of accounting document line items, and the number of pre-aggregated totals that the used ERP system creates and manages for the data set. The different data sets are shown in Table 1.

TABLE 1

Different Test Data Sets

| Size | Accounting docs | Line items | Totals |
|---|---|---|---|
| XS | 30,000 | 100,000 | 10,159 |
| S | 150,000 | 500,000 | 49,002 |
| M | 300,000 | 1,000,000 | 100,952 |
| L | 1,500,000 | 5,000,000 | 442,019 |
| XL | 3,000,000 | 10,000,000 | 474,331 |

The performance of both MaxDB and TREX has been measured on the same machine. The hardware configuration of the testbed is shown in Table 2.

TABLE 2

Testbed Hardware

| Component | Description |
|---|---|
| Operating System | Gentoo Linux 2.6.21-gentoo |
| CPUs | 4 × Dual Core AMD Opteron @ 2.8 GHz 1 MB L2 Cache |
| Main Memory | 32 GB @ 667 MHz |
| Hard Drives | 2 × 300 GB (reads 89 MB per second) |
| MaxDB Version | 7.6.00.37 for Linux x86 64 |
| TREX Version | 7.10.04.00 (Build: 2007 Jun. 19) |

Table 3 shows the results of the measurements in seconds. All results are averaged over 20 queries. Before the measurements were started, 40 queries were ran against the database to make sure that the measurements take the database cache into account.

TABLE 3

Measurement Results (in Seconds)

| | Use Case 1 (All Accounts) | | Use Case 2 (Specific Account) | |
|---|---|---|---|---|
| Data set | MaxDV | TREX | MaxDB | TREX |
| XS | 0.12 | 0.10 | 0.04 | 0.06 |
| S | 0.46 | 0.34 | 0.10 | 0.23 |
| M | 1.04 | 0.59 | 0.16 | 0.42 |
| L | 3.83 | 1.80 | 0.59 | 1.50 |
| XL | 4.50 | 2.16 | 0.66 | 2.10 |

The average response times of TREX are similar for both use cases. This is due to the fact that TREX has to do a full table scan for both use cases. In the first use case (retrieving the totals of all accounts), MaxDB has to perform a full table scan on the table containing the pre-aggregated totals. Still, the average response time of TREX is slightly better than the average of MaxDB. It is noteworthy that the ratio of the number of rows in the totals table in MaxDB to the number of line items in TREX is about 1:10 for most data set sizes. In the second use case (retrieving totals for a specific account), in contrast, TREX is slower than MaxDB. Yet, the calculation on-the-fly allows for an easier architecture of the ERP system in the sense that no totals have to be updated regularly so that they are consistent with the accounting document line items. The slightly slower query performance for specific totals buys more flexibility, because it enables to calculate totals directly on the aggregation level required for the balance sheet, as opposed to post-query aggregation in the ERP system.

Implementation

Figure 10:
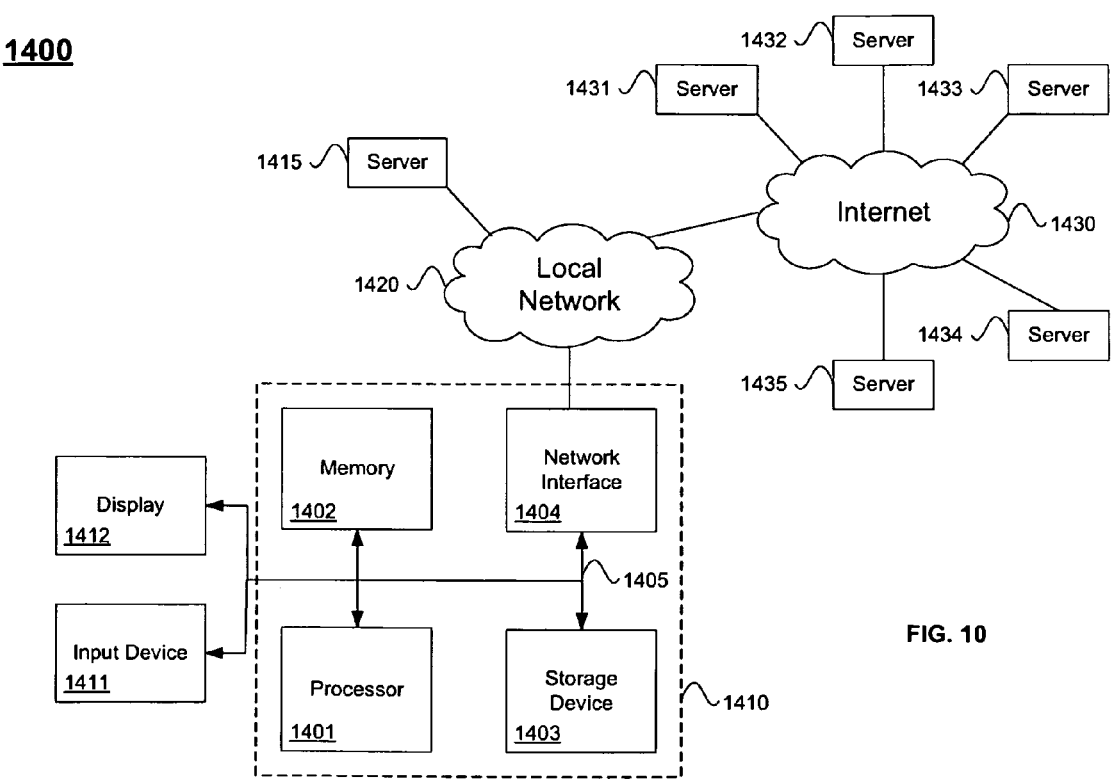
FIG. 10 is a block diagram of an example computer system and network for implementing embodiments of the present invention.

FIG. 10 is a block diagram of an example computer system and network 1400 for implementing embodiments of the present invention. Computer system 1410 includes a bus 1405 or other communication mechanism for communicating information, and a processor 1401 coupled with bus 1405 for processing information. Computer system 1410 also includes a memory 1402 coupled to bus 1405 for storing information and instructions to be executed by processor 1401, including information and instructions for performing the techniques described above. This memory may also be used for storing temporary variables or other intermediate information during execution of instructions to be executed by processor 1401. Possible implementations of this memory may be, but are not limited to, random access memory (RAM), read only memory (ROM), or both. A storage device 1403 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1403 may include source code, binary code, or software files for performing the techniques or embodying the constructs above, for example.

Computer system 1410 may be coupled via bus 1405 to a display 1412, such as a cathode ray tube (CRT) or liquid crystal display (LCD), for displaying information to a computer user. An input device 1411 such as a keyboard and/or mouse is coupled to bus 1405 for communicating information and command selections from the user to processor 1401. The combination of these components allows the user to communicate with the system. In some systems, bus 1405 may be divided into multiple specialized buses.

Computer system 1410 also includes a network interface 1404 coupled with bus 1405. Network interface 1404 may provide two-way data communication between computer system 1410 and the local network 1420. The network interface 1404 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 1404 sends and receives electrical, electromagnetic, or optical signals that carry digital data streams representing various types of information.

Computer system 1410 can send and receive information, including messages or other interface actions, through the network interface 1404 to an Intranet or the Internet 1430. In the Internet example, software components or services may reside on multiple different computer systems 1410 or servers 1431, 1432, 1433, 1434 and 1435 across the network. A server 1431 may transmit actions or messages from one component, through Internet 1430, local network 1420, and network interface 1404 to a component on computer system 1410.

Conclusion

An embodiment of the present invention proposes an architecture for reporting that directly uses an OLTP system as the data source and, thus,
- does not require bulk ETL loads to replicate the data to a DW system,
- does not require to manage aggregates of the OLTP data on various different levels,
- is not limited to providing reports for which OLAP data structures (i.e. cubes) exist, and
- does not require more than one single persistence for both OLTP and OLAP.

Main memory technologies such as the column-oriented storage paradigm may be used to realize this architecture. The architecture has been validated with a prototypical implementation on the basis of SAP Business ByDesign, a mid-market business software solution. A case study from financial accounting has been introduced to illustrate one possible application of the proposed reporting architecture. Real customer financial data has been used to generate test data sets of different sizes. A prototypical implementation was benchmarked against the direct extraction of the data for the presented reporting use case from SAP Business ByDesign. The results have shown that it is possible to produce a report with the totals of all accounts, each of which is aggregated from a table containing 10 million rows, within a response time of 2.1 seconds. The implications of these results are that the storage of aggregates in cube-like structures is—at least in the area of financial accounting—no longer required.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer system storing a computer program for processing database information for both transacting and reporting, said computer program being executed by said computer system, the computer system comprising:
   - a processor;
   - a memory;
   - a relational database management system component, implemented by the computer system, wherein said relational database management component stores said database information in a row format; and
   - a column-oriented data processing component, implemented by the computer system, wherein said column-oriented data processing component stores said database information in a column format using vertical fragmentation,
   - in response to a database update request, said relational database management system component updates said database information stored in said row format, said relational database management system component notifies said column-oriented data processing component of said database update request, and said column-oriented data processing component updates said database information stored in said column format, whereby said relational database management system component and said column-oriented data processing component share a consistent view of said database information, and
   - in response to a query request to retrieve data, said column-oriented data processing component generates a query response based on said database information stored in said column format, wherein generating the query response accesses only one or more columns needed directly for generating the query response.

2. The computer system of claim 1, wherein said computer system further comprises:
   - a virtual cube interface component, implemented by the computer system, wherein said virtual cube interface component maps an on-line analytical processing query into an aggregation call, wherein said virtual cube interface component sends said aggregation call to said column-oriented data processing component as said query request.

3. The computer system of claim 1, wherein said database information stored in said row format and said database information stored in said column format are stored in a main memory of said computer system.

4. The computer system of claim 1, wherein said column-oriented data processing component comprises:
   - a main index component, wherein said main index component stores main data corresponding to said database information;
   - a delta index component, wherein said delta index component stores delta data corresponding to a plurality of updated database information; and
   - a monitoring component, wherein said monitoring component merges said delta data stored in said delta index component into said main data stored in said main index component according to a criterion.

5. The computer system of claim 1, wherein said relational database management system component comprises:
   - a plurality of database tables;
   - a queue of index objects; and
   - a kernel, wherein said kernel manages the plurality of database tables, wherein said kernel manages the queue of index objects, and wherein said kernel interacts with a file system.

6. The computer system of claim 1, wherein said relational database management system component communicates with said column-oriented data processing component via a delta updates access.

7. The computer system of claim 1, wherein said column-oriented data processing component communicates with said relational database management system component via a persist data access.

8. The computer system of claim 1, wherein said database information includes a plurality of values, wherein said plurality of values are stored in said row format, and wherein said plurality of values are stored in said column format.

9. The computer system of claim 1, wherein said database information includes a plurality of values, wherein said plurality of values are stored in said row format, and wherein said plurality of values are copied and are stored in said column format.

10. The computer system of claim 1, wherein said database information includes a plurality of values, wherein said plurality of values are stored in said row format, and wherein said plurality of values are replicated and are stored in said column format.

11. The computer system of claim 1, wherein said database information includes a plurality of values, wherein said plurality of values are stored in said row format, wherein said plurality of values are stored in said column format, and wherein said plurality of values stored in said row format are a same data as said plurality of values stored in said column format.

12. The computer system of claim 1, wherein said database information stored in said row format are a same data as said database information stored in said column format.

13. The computer system of claim 1, wherein said database information includes a plurality of columns, wherein said column-oriented data processing component stores each of said plurality of columns as a plurality of tables, respectively, with a plurality of surrogate identifiers duplicated in each of said plurality of tables.

14. The computer system of claim 1, wherein said column-oriented data processing component stores said database information in said column format using compression.

15. The computer system of claim 1, wherein said database information stored in said row format and said database information stored in said column format are stored in a volatile main memory of said computer system.

16. The computer system of claim 1, wherein said column-oriented data processing component stores said database information using both vertical fragmentation and horizontal fragmentation.

17. The computer system of claim 1, wherein each column is stored by itself.

18. The computer system of claim 1, wherein the one or more columns needed directly for creating the result is not all the columns.

19. A computer-implemented method of processing database information for both transacting and reporting, comprising the steps of:
storing said database information in a row format;
storing said database information in a column format using vertical fragmentation;
in response to a database update request, updating said database information stored in said row format, locking said database information stored in said row format, updating said database information stored in said column format, and unlocking said database information stored in said row format after said database information stored in said column format has been updated, whereby said relational database management system component and said column-oriented data processing component share a consistent view of said database information; and
in response to a query request to retrieve data, generating a query response based on said database information stored in said column format, wherein generating the query response accesses only one or more columns needed directly for generating the query response.

20. A computer program embodied on a non-transitory computer-readable medium and implemented by a computer system for processing database information for both transacting and reporting, wherein said computer system includes a processor and a memory, said computer program being executed by said computer system and comprising:
a relational database management system component, wherein said relational database management component stores said database information in a row format; and
a column-oriented data processing component, implemented by a plurality of networked computers, wherein said column-oriented data processing component stores said database information in a column format using vertical fragmentation across a plurality of networked computers,
in response to a database update request, said relational database management system component updates said database information stored in said row format, said relational database management system component notifies said column-oriented data processing component of said database update request, and said column-oriented data processing component updates said database information stored in said column format, whereby said relational database management system component and said column-oriented data processing component share a consistent view of said database information, and
in response to a query request to retrieve data, said column-oriented data processing component generates a query response based on said database information stored in said column format, wherein generating the query response accesses only one or more columns needed directly for generating the query response.

* * * * *